Oct. 3, 1950 A. NIEDERHAUSER Re. 23,278

TOGGLE LINK JACK WITH TWO LIFTING PHASES

Original Filed Aug. 6, 1947 2 Sheets-Sheet 1

Inventor:

Alfred Niederhauser

TOGGLE LINK JACK WITH TWO LIFTING PHASES
Original Filed Aug. 6, 1947 2 Sheets-Sheet 2
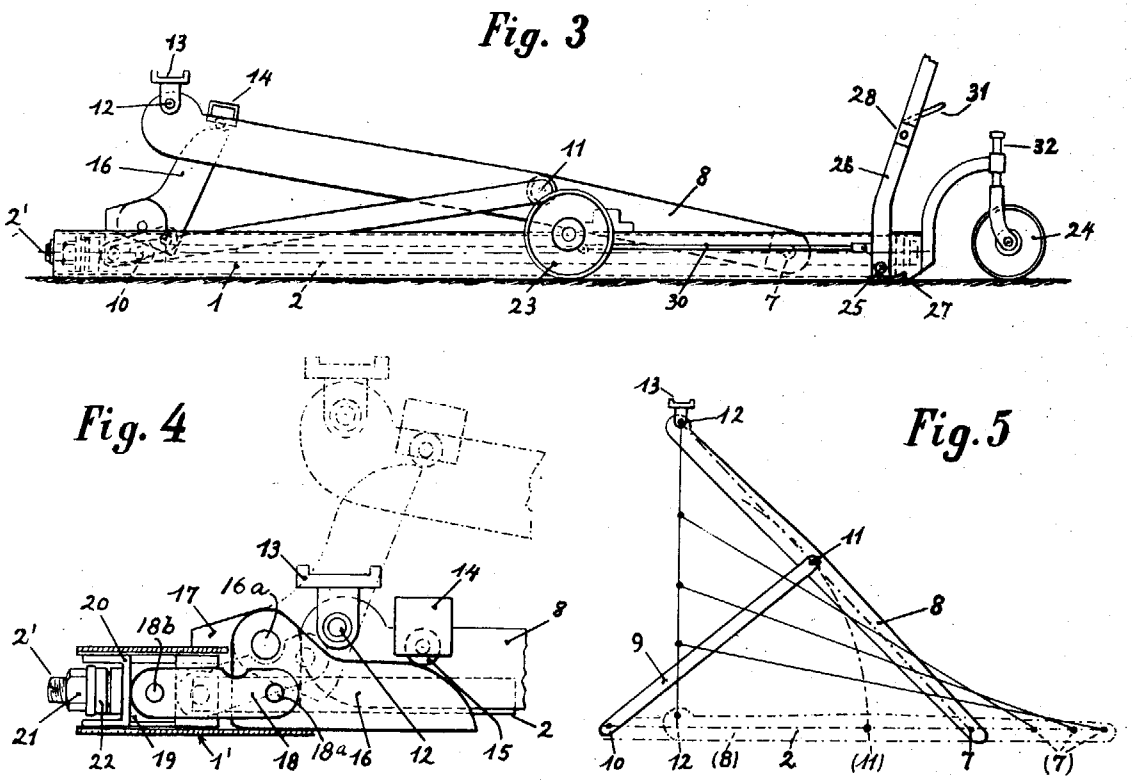
Inventor:
Alfred Niederhauser Reissued Oct. 3, 1950

Re. 23,278

UNITED STATES PATENT OFFICE 23,278

TOGGLE LINK JACK WITH TWO LIFTING PHASES

Alfred Niederhauser, Salt Lake City, Utah

Original No. 2,458,407, dated January 4, 1949, Serial No. 766,811, August 6, 1947. Application for reissue February 24, 1950, Serial No. 146,095. In Switzerland October 21, 1944

Section 1, Public Law 690, August 8, 1946
Patent expires October 21, 1964

9 Claims. (Cl. 254—9)

Matter enclosed in heavy brackets [ ] appears in the original patent but forms no part of this reissue specification; matter printed in italics indicates the additions made by reissue

The present invention refers to a lifting jack for automobiles and other loads, which has two lifting arms parallel to each other and connected together at their free ends by a tippable beam, the arms being jointed at their lower ends each to a threaded sleeve movable by a threaded spindle, and being pivotably connected by links to the frame of the lifting jack.

In known lifting jacks of this kind, lifting arms are arranged directed opposite to one another, their upper ends carrying a saddle for engaging on the load, and their lower ends being moved towards each other in order to raise the arms. Other known lifting jacks have only one lifting arm or a pair of lifting arms, to whose middle part links are attached, which are directed opposite to each other and swivelling on the frame of the lifting jack. With these jacks, in order that the power exerted may not be too great and injurious at the beginning of the lift of the lifting arms i. e. in their lowest position, the lifting arms directed against each other or the lifting arms with their links must form a suitable angle at their connecting place, which makes it practically impossible to construct such jacks with the desired very low height and suitable for heavy loads.

On the other hand, the aim of the present invention is to create a very low lifting jack adaptable also for big loads, in which jack the fulcrums of the levers are not unduly stressed in any position of the lifting arms.

The essential features of the invention can be ascertained from the following description and the corresponding drawings.

Fig. 3 shows a side view of the lifting jack set ready for service, with the lifting arms in the first lifting phase.

Fig. 4 illustrates, on a larger scale, the mechanism for effecting the first lifting phase.

Fig. 5 is a diagrammatic representation of the position of the joint of a lifting arm, of its link and of the tippable beam.

Figure 2:
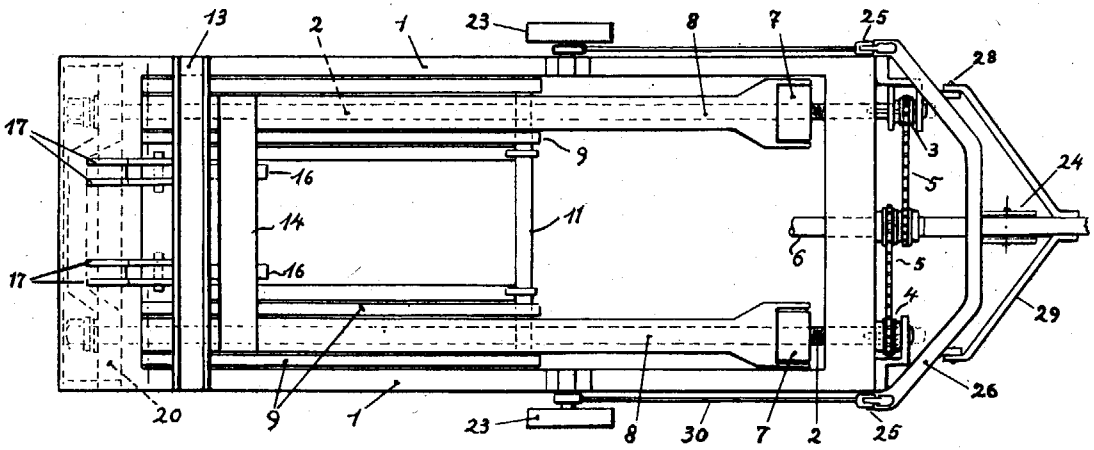

The transportable lifting jack has a rectangular frame 1 formed of channel iron in which two parallel threaded spindles 2 are rotatably supported and axially displaceable through a certain distance. These spindles 2 are connected to each other through sprockets 3, 4 and chain 5, and are in synchronous rotational connection with a driving shaft 6 which can be coupled to a motor not shown in the drawing. On each threaded spindle 2 a threaded sleeve 7 (Fig. 2) is screwed, to one of which sleeves each lower end of a lifting arm 8 is pivotally connected. Opposite the two lever arms 8, a link 9 is arranged on each of their two sides, which link is held pivoted at its lower end on a pivot pin 10 fixed on the frame 1. The upper ends of the links 9 are carried on the bar 11 connecting the lifting arms 8. On each of the free ends of the lifting arms 8 a pivot pin 12 is arranged above their longitudinal middle axis, to which a lifting beam 13 is tippably arranged, bridging over these ends. These ends of the lifting arms are also rigidly connected together by a cross bar 14, whose middle part, as shown in Fig. 4 lies by means of rollers 15 on each of the shoe-shaped angle-levers 16 when the lifting arms 8 are in the lowest, horizontal position. Each of the two bellcranks or angle-levers 16 is pivoted by a pin 16a to a pair of straps 17 (Fig. 2) which are rigidly secured to the frame 1. A link 18 (Fig. 4) is pivoted at one end to each bellcrank 16 by means of a pin 18a some distance below pin 16a and at the other end by pin 18b to a headpiece 19 movable in the frame. The headpiece 19 is firmly connected to a beam 20 which extends over the whole width of the rear part of the lifting jack frame 1 and is displaceably supported with its ends in the two profile irons 1 on both sides of the frame (Fig. 4). The two rear ends of the threaded spindles serving to drive the lifting device are formed as threaded pins and lead through bores in the headpiece 19 and the beam 20. Between each of the nuts 21 fixed on the spindle ends 2′ and the beam 20, a ball bearing 22 is arranged which can withstand great pressures. In consequence of being supported axially displaceable in the frame 1, the two spindles 2 at the beginning of their lifting drive recede, i. e., shift to the right as seen in Fig. 2, under the effect of the force acting on the sleeves 7 which is caused by the weight of the lifting member and any load on it. The beam 20 with its headpiece 19 is pulled to the right, as seen in Fig. 4, by nuts 21 on spindles 2, transmitting its motion through link 18 to the angle-lever 16, thus causing it to pivot up and so cause the arms 8 to be raised underneath the engaging places on the load. The first lifting phase of the lifting device is consequently not effected by moving the lifting arm joints on the threaded sleeves, so that even with lifting arms and links lying beside each other at the optimum depth and even horizontally, a raising of heavy loads is possible without the joints of the lifting mechanism being subjected to unduly great radial pressures which would cause them to fail by shearing.

The axles of the joints of the lifting mechanism, as diagrammatically illustrated in Fig. 5, are arranged so that, with the spindle axis 2 in horizontal position and the lever arm 8 in lowest position, the fixed axis 10 on frame 1 for the pivoting of the link 9 lies approximately at the same height as the pivot axle 7 of the lifting arm 8 at the threaded sleeve of the spindle 2, but lower than the tipping axle 12 of the beam 13 which is located above the longitudinal middle axis at the free end of the lifting arm 8. The result of this arrangement of the pivot axes, which is also in accordance with the invention, is that in being raised or lowered the lifting beam 13 describes a vertical path, whereby in the case of heavy loads dangerous lateral displacements of them are prevented.

By the described arrangement of the members which produce the first lifting phase, by the manner in which the levers grip under the crossbeam of the lifting arms, also with the desired low build of the lifting jack—which presumes an initial position with the lifting members laid together approximately, in one plane—a slight raising of these members is obtained until the formation of a suitable triangle of forces for the initial movement caused by the thrust effect on one end of the lifting arms. In addition, the drive of each of the two spindles allocated to the two lifting arms by a common driving shaft gives a lifting movement of the lifting beam the same in each phase, in spite of the loading at the different positions of the beam being in practice generally unequal.

Figure 1:
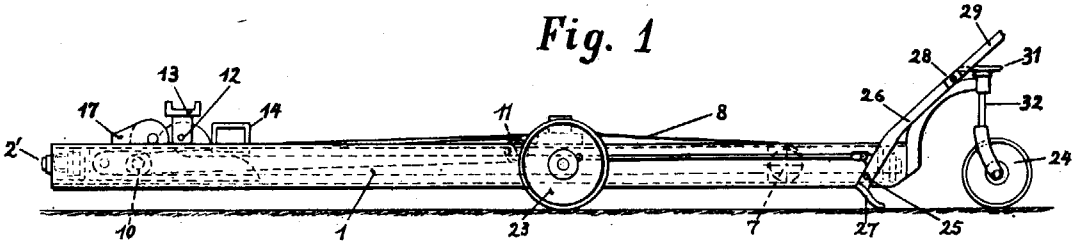
Fig. 1 shows a side view of the transportable lifting jack with the lifting arms in the lowest position, without driving motor, and Fig. 2 the same in plan view.

For driving the shaft 6 a motor (not shown) erected on the frame 1 is in known manner provided with control members for automatically switching the motor off when the highest and lowest positions of the lifting beam 13 are reached. The lifting jack is made transportable by the members 23 to 32, inclusive whose function is apparent from Figs. 1 and 3. This mechanism forms the subject matter of my copending application Serial No. 766,812, filed August 6, 1947.

What I claim and desire to protect by Letters Patent is:

1. A lifting jack comprising a frame, a link pivotally connected at one end to said frame, driven means mounted in said frame for movement toward and away from said pivotal connection, a lifting arm pivoted at one end to said means and at an intermediate point to the other end of said link, thereby forming a toggle mechanism which in lowest position has the three pivot points substantially in horizontal alignment, and auxiliary means *independent of said link operating on said lifting arm between its free end and its pivotal connection with said link* for lifting the free end of said lifting arm sufficiently to form a suitable triangle of forces for the lifting movement of said lifting arm produced by said driven means.

2. A lifting jack comprising a frame; lifting members including a lifting arm slidably mounted at one end in said frame and a link pivoted at its respective ends to said frame and to said lifting arm intermediate its ends, said members in initial position lying approximately in a horizontal plane; means for moving said slidably mounted end of said lifting arm toward and away from said link; and an auxiliary device *operating on said lifting arm between its free end and its pivotal connection with said link* for lifting the free end of said lifting arm from said initial position sufficiently to form a suitable triangle of forces for the lifting movement produced by movement of said means toward said link and for lowering the same to initial position on return movement.

3. A lifting jack comprising a frame, a threaded spindle rotatably mounted in said frame and capable of axial displacement, a threaded sleeve on said spindle, a lifting arm pivoted at one end to said sleeve, a link pivoted at its respective ends to said frame and to said lifting arm intermediate its ends, an angle lever pivoted to said frame with one arm adapted to raise and lower the free end of said lifting arm respectively from and to an initial position and with the other arm operatively connected with said spindle for movement when said spindle is axially displaced, and means for rotating said spindle.

4. A lifting jack comprising a frame, two threaded spindles rotatably mounted in spaced parallel relation in said frame and capable of limited axial movement, a threaded sleeve on each spindle, two parallel lifting arms connected together adjacent to their free ends by a crossbar and each pivoted at the other end to one of said sleeves, links pivoted at their respective ends to said frame remote from said sleeves and to said lifting arms intermediate the ends thereof, an angle lever pivoted to said frame with one arm adapted to engage said crossbar and the other arm operatively connected with said spindles for movement when they are axially displaced, and means for rotating said spindles.

5. A lifting jack comprising a rectangular frame, a beam movably mounted in said frame adjacent to one end thereof, two threaded spindles rotatably mounted in spaced parallel relation in said frame at one end and in said beam at the other end and capable of axial displacement in said frame, a nut on each spindle engageable with said beam, a threaded sleeve on each spindle adjacent to the end mounted in said frame, two parallel lifting arms connected together adjacent to their free ends by a crossbar and each pivoted at the other end to one of said sleeves, links pivoted at their respective ends to said frame remote from said sleeves and to said lifting arms intermediate the ends thereof, said lifting arms and links in the lowest position lying approximately in one plane within said frame, two bellcranks pivoted to said frame adjacent to said beam with one arm adapted to engage said crossbar for an initial phase of its upward movement, a link connecting the other arm of each bellcrank with said beam, and means for rotating said spindles in unison whereby the initial force exerted by said sleeves displaces said spindles axially and through said nuts moves the beam and bellcranks to raise the free end of said lifting arm for the initial phase of its upward movement and thereafter the force exerted by said sleeves moves the pivoted ends of said lifting arms in said frame and completes the upward movement of the free ends thereof by toggle action.

6. A lifting jack as set forth in claim 5 in which a lifting beam is pivoted to the free ends of said lifting arms.

7. A lifting jack as set forth in claim 6 in which said lifting beam moves vertically.

8. A lifting jack comprising a frame, two threaded spindles journaled in said frame, a threaded sleeve on each spindle, a lifting arm pivoted at one end to each of said sleeves, a beam pivoted to the other ends of said arms, links pivoted at one end to said frame and at the other end to said arms between said sleeve and beam pivots, all said pivots except said beam pivots lying substantially in a plane in said frame when the lifting arms are in lowest position, said beam pivots being above said plane, means for rotating said spindles, and auxiliary means to impart initial upward movement to said lifting arms from said lowest position upon rotation of said spindles.

9. A lifting jack adapted for lifting heavy loads high enough for a man to work conveniently thereunder comprising a low rectangular frame capable of resting directly over its entire area on a flat supporting surface, a pair of lifting arms slidably mounted at one end in said frame, links pivoted at their respective ends to said frame and said lifting arms at a point intermediate the ends thereof, said links and lifting arms forming a toggle which in lowest position lies approximately in one plane in said frame, means for producing a thrust on the slidably mounted ends of said lifting arms, and means *operating on at least one of said lifting arms between its free end and its pivotal connection with said link* for raising said lifting arms an initial distance sufficient to form a suitable triangle of forces for the initial movement caused by said thrust.

ALFRED NIEDERHAUSER.

REFERENCES CITED

The following references are of record in the file of this patent or the original patent:

UNITED STATES PATENTS

| Number | Name | Date |
|---|---|---|
| 2,080,963 | Fielder | May 18, 1937 |
| 2,147,837 | Gottman | Feb. 21, 1939 |
| 2,233,745 | Nilson | Mar. 4, 1941 |
| 2,264,979 | Jackson | Dec. 2, 1941 |
| 2,400,316 | Page | May 14, 1946 |

FOREIGN PATENTS

| Number | Country | Date |
|---|---|---|
| 342,093 | Great Britain | Jan. 29, 1931 |
| 371,968 | Great Britain | May 5. 1932 |